(12) United States Patent
Desanti et al.

(10) Patent No.: US 9,737,819 B2
(45) Date of Patent: Aug. 22, 2017

(54) SYSTEM AND METHOD FOR A MULTI-PRIZE MYSTERY BOX THAT DYNAMICALLY CHANGES PROBABILITIES TO ENSURE PAYOUT VALUE

(71) Applicant: KABAM, INC., San Francisco, CA (US)

(72) Inventors: Brian Desanti, San Bruno, CA (US); Tim Ernst, Millbrae, CA (US); Travis Hawk, San Bruno, CA (US); Rick Mendoza, Downey, CA (US); Peter Im, San Bruno, CA (US)

(73) Assignee: Kabam, Inc., San Francisco, CA (US)

( * ) Notice: Subject to any disclaimer, the term of this patent is extended or adjusted under 35 U.S.C. 154(b) by 234 days.

(21) Appl. No.: 13/948,847

(22) Filed: Jul. 23, 2013

(65) Prior Publication Data
US 2015/0031440 A1    Jan. 29, 2015

(51) Int. Cl.
A63F 13/00    (2014.01)
A63F 13/822    (2014.01)
A63F 13/69    (2014.01)

(52) U.S. Cl.
CPC ............ *A63F 13/822* (2014.09); *A63F 13/69* (2014.09)

(58) Field of Classification Search
CPC ......... A63F 13/69; A63F 13/822; A63F 13/00
See application file for complete search history.

(56) References Cited

U.S. PATENT DOCUMENTS

| | | |
|---|---|---|
| 5,816,918 A | 10/1998 | Kelly |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |

(Continued)

FOREIGN PATENT DOCUMENTS

| | | |
|---|---|---|
| KR | 1020130137431 | 12/2013 |
| WO | WO 02/26333 | 4/2002 |

(Continued)

OTHER PUBLICATIONS

<http://lotro-wiki.com/index.php?title=Ouest:A_Little_Extra_Never_Hurts_-_Part_2&oldid=399366>, <http://lotrowiki.com/index.php ?title=Getting_Started&oldid=349681 >. Links are to used articles. (7 pgs) Feb. 26, 2014.

(Continued)

*Primary Examiner* — Jay Liddle
*Assistant Examiner* — Alex F. R. P. Rada, II
(74) *Attorney, Agent, or Firm* — Sheppard Mullin Richter & Hampton LLP

(57) ABSTRACT

One aspect of the disclosure relates to a multi-prize mystery box that dynamically changes probabilities to ensure payout value in an online game. The multi-prize mystery box which dynamically changes probabilities may provide the ability to arrange multiple items in a mystery box. The probability of acquiring an instance of the second item through Nth item may be dynamically weighted based on the value of the first item.

21 Claims, 11 Drawing Sheets

(56) References Cited

U.S. PATENT DOCUMENTS

| | | | |
|---|---|---|---|
| 6,850,900 B1 | 2/2005 | Hare | |
| 6,928,474 B2 | 8/2005 | Venkatesan | |
| 7,076,453 B2 | 7/2006 | Jammes | |
| 7,381,133 B2 | 6/2008 | Thomas | |
| 7,533,336 B2 | 5/2009 | Jaffe | |
| 7,660,740 B2 | 2/2010 | Boone | |
| 7,682,239 B2 | 3/2010 | Friedman et al. | 463/16 |
| 7,785,188 B2 | 8/2010 | Cannon | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,057,294 B2 | 11/2011 | Pacey | |
| 8,157,635 B2 | 4/2012 | Hardy | |
| 8,187,101 B2 | 5/2012 | Herrmann | |
| 8,226,472 B2 | 7/2012 | Van Luchene | |
| 8,239,487 B1 | 8/2012 | Hoffman | |
| 8,272,956 B2 | 9/2012 | Kelly | |
| 8,282,491 B2 | 10/2012 | Auterio | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker | |
| 8,317,601 B1 | 11/2012 | Luciano, Jr. | |
| 8,332,260 B1 | 12/2012 | Mysen | |
| 8,348,716 B2 | 1/2013 | Ganz | |
| 8,348,767 B2 | 1/2013 | Mahajan | |
| 8,360,858 B2 | 1/2013 | LaRocca | |
| 8,360,867 B2 | 1/2013 | VanLuchene | |
| 8,366,544 B2 | 2/2013 | Walker | |
| 8,371,925 B2 | 2/2013 | Bonney | |
| 8,376,826 B2 | 2/2013 | Katz et al. | 463/16 |
| 8,401,913 B2 | 3/2013 | Alivandi | |
| 8,439,759 B1 | 5/2013 | Mello | |
| 8,512,150 B2 | 8/2013 | Herrmann | |
| 8,636,591 B1 | 1/2014 | Hawk | |
| 8,696,428 B1 | 4/2014 | Post | |
| 8,715,068 B2 | 5/2014 | Arnone | |
| 8,777,754 B1 | 7/2014 | Santini | |
| 8,790,185 B1 | 7/2014 | Caldarone | |
| 8,821,260 B1 | 9/2014 | DeSanti | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,138,639 B1 | 9/2015 | Ernst | |
| 9,257,007 B2 | 2/2016 | Santini | |
| 2002/0059397 A1 | 5/2002 | Feola | |
| 2002/0072412 A1 | 6/2002 | Young | |
| 2002/0095327 A1 | 7/2002 | Zumel | |
| 2002/0151351 A1 | 10/2002 | Baerlocher | |
| 2002/0165794 A1* | 11/2002 | Ishihara | G06Q 10/087 705/27.1 |
| 2003/0027619 A1 | 2/2003 | Nicastro | |
| 2003/0032476 A1 | 2/2003 | Walker | |
| 2003/0102625 A1 | 6/2003 | Katz et al. | 273/138.1 |
| 2003/0109301 A1 | 6/2003 | Chudley | |
| 2003/0157978 A1 | 8/2003 | Englman | |
| 2003/0174178 A1 | 9/2003 | Hodges | |
| 2003/0216167 A1 | 11/2003 | Gauselmann | |
| 2004/0002387 A1* | 1/2004 | Grady | A63F 1/18 463/43 |
| 2004/0068451 A1 | 4/2004 | Lenk | |
| 2004/0215524 A1 | 10/2004 | Parkyn | |
| 2004/0224745 A1 | 11/2004 | Bregenzer | |
| 2004/0267611 A1 | 12/2004 | Hoerenz | |
| 2005/0096117 A1 | 5/2005 | Katz | |
| 2005/0114223 A1 | 5/2005 | Schneider | |
| 2005/0165686 A1 | 7/2005 | Zack | |
| 2005/0192087 A1 | 9/2005 | Friedman | |
| 2005/0209008 A1 | 9/2005 | Shimizu | |
| 2005/0227751 A1 | 10/2005 | Zanelli | |
| 2005/0255914 A1 | 11/2005 | McHale | |
| 2005/0277474 A1 | 12/2005 | Barry | |
| 2006/0030407 A1 | 2/2006 | Thayer | |
| 2006/0063587 A1 | 3/2006 | Manzo | |
| 2006/0116196 A1 | 6/2006 | Vancura | |
| 2006/0155597 A1 | 7/2006 | Gleason | |
| 2006/0200370 A1 | 9/2006 | Ratliff | |
| 2006/0287029 A1 | 12/2006 | Yoshinobu | |
| 2007/0077988 A1 | 4/2007 | Friedman | |
| 2007/0129139 A1 | 6/2007 | Nguyen | |
| 2007/0281285 A1 | 12/2007 | Jayaweera | |
| 2008/0009344 A1 | 1/2008 | Graham | |
| 2008/0032787 A1 | 2/2008 | Low | |
| 2008/0058092 A1 | 3/2008 | Schwartz | |
| 2008/0113706 A1 | 5/2008 | OHalloran | |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0176625 A1 | 7/2008 | Kelly | |
| 2008/0194318 A1 | 8/2008 | Kralicky | |
| 2008/0207306 A1 | 8/2008 | Higbie | |
| 2008/0214295 A1 | 9/2008 | Dabrowski | |
| 2008/0227525 A1 | 9/2008 | Kelly | |
| 2008/0234043 A1 | 9/2008 | McCaskey | |
| 2008/0248867 A1 | 10/2008 | Englman | |
| 2008/0275786 A1 | 11/2008 | Gluck | |
| 2008/0300045 A9 | 12/2008 | Ratcliff | |
| 2008/0318668 A1 | 12/2008 | Ching | |
| 2009/0011812 A1 | 1/2009 | Katz | |
| 2009/0017886 A1 | 1/2009 | McGucken | |
| 2009/0036199 A1 | 2/2009 | Myus | |
| 2009/0048918 A1 | 2/2009 | Dawson | |
| 2009/0061982 A1 | 3/2009 | Brito | |
| 2009/0124353 A1 | 5/2009 | Collette | |
| 2009/0204907 A1 | 8/2009 | Finn | |
| 2009/0210301 A1 | 8/2009 | Porter | |
| 2009/0234710 A1 | 9/2009 | Belgaied Hassine | |
| 2010/0004048 A1 | 1/2010 | Brito | |
| 2010/0035689 A1 | 2/2010 | Altshuler | |
| 2010/0041472 A1 | 2/2010 | Gagner | |
| 2010/0041481 A1 | 2/2010 | Smedley | |
| 2010/0050088 A1 | 2/2010 | Neustaedter | |
| 2010/0094841 A1 | 4/2010 | Bardwil | |
| 2010/0174593 A1 | 7/2010 | Cao | |
| 2010/0198653 A1 | 8/2010 | Bromenshenkel | |
| 2010/0227675 A1 | 9/2010 | Luxton | |
| 2010/0228606 A1 | 9/2010 | Walker | |
| 2010/0240444 A1 | 9/2010 | Friedman | |
| 2010/0241491 A1 | 9/2010 | Eglen | |
| 2010/0241492 A1 | 9/2010 | Eglen et al. | 705/10 |
| 2011/0092271 A1 | 4/2011 | Nguyen | |
| 2011/0092273 A1 | 4/2011 | Cerbini | |
| 2011/0113353 A1 | 5/2011 | Koh | |
| 2011/0118002 A1 | 5/2011 | Aoki | |
| 2011/0145040 A1 | 6/2011 | Zahn | |
| 2011/0151957 A1 | 6/2011 | Falciglia | |
| 2011/0218033 A1 | 9/2011 | Englman | |
| 2011/0263324 A1 | 10/2011 | Ganetakos | |
| 2011/0275438 A9 | 11/2011 | Hardy | |
| 2011/0281638 A1 | 11/2011 | Bansi | |
| 2011/0282764 A1 | 11/2011 | Borst | |
| 2011/0300923 A1 | 12/2011 | Van Luchene | |
| 2011/0319152 A1 | 12/2011 | Ross | |
| 2012/0011002 A1 | 1/2012 | Crowe | |
| 2012/0034973 A1 | 2/2012 | Frank | |
| 2012/0040743 A1 | 2/2012 | Auterio | |
| 2012/0040761 A1 | 2/2012 | Auterio | |
| 2012/0042282 A1 | 2/2012 | Wong | |
| 2012/0047002 A1 | 2/2012 | Patel | |
| 2012/0059730 A1 | 3/2012 | Jensen | |
| 2012/0094743 A1 | 4/2012 | Odom | |
| 2012/0101886 A1 | 4/2012 | Subramanian | |
| 2012/0108306 A1 | 5/2012 | Munsell | |
| 2012/0109785 A1 | 5/2012 | Karlsson | |
| 2012/0115593 A1 | 5/2012 | Vann | |
| 2012/0122589 A1 | 5/2012 | Kelly | |
| 2012/0129590 A1 | 5/2012 | Morrisroe | |
| 2012/0130856 A1 | 5/2012 | Petri | |
| 2012/0142429 A1 | 6/2012 | Muller | |
| 2012/0157193 A1 | 6/2012 | Arezina et al. | 463/25 |
| 2012/0166380 A1 | 6/2012 | Sridharan | |

(56) References Cited

U.S. PATENT DOCUMENTS

| | | | |
|---|---|---|---|
| 2012/0178515 A1 | 7/2012 | Adams | |
| 2012/0178529 A1 | 7/2012 | Collard | |
| 2012/0197874 A1 | 8/2012 | Zatkin | |
| 2012/0202570 A1 | 8/2012 | Schwartz | |
| 2012/0203669 A1 | 8/2012 | Borsch | |
| 2012/0215667 A1 | 8/2012 | Ganz | |
| 2012/0221430 A1 | 8/2012 | Naghmouchi | |
| 2012/0231891 A1 | 9/2012 | Watkins | |
| 2012/0244945 A1 | 9/2012 | Kolo | |
| 2012/0244950 A1 | 9/2012 | Braun | |
| 2012/0245988 A1 | 9/2012 | Pace | |
| 2012/0289315 A1 | 11/2012 | Van Luchene | |
| 2012/0289330 A1 | 11/2012 | Leydon | |
| 2012/0289346 A1 | 11/2012 | VanLuchene | |
| 2012/0295699 A1 | 11/2012 | Reiche | |
| 2012/0296716 A1 | 11/2012 | Barbeau | |
| 2012/0302329 A1 | 11/2012 | Katz et al. | 463/25 |
| 2012/0309504 A1 | 12/2012 | Isozaki | |
| 2012/0311504 A1 | 12/2012 | vanOs | |
| 2013/0005437 A1 | 1/2013 | Bethke | |
| 2013/0005466 A1 | 1/2013 | Mahajan | |
| 2013/0005473 A1 | 1/2013 | Bethke | |
| 2013/0005475 A1 | 1/2013 | Mahajan | |
| 2013/0005480 A1 | 1/2013 | Bethke | |
| 2013/0006736 A1 | 1/2013 | Bethke | |
| 2013/0012304 A1 | 1/2013 | Cartwright | |
| 2013/0013459 A1 | 1/2013 | Kerr | |
| 2013/0072278 A1 | 3/2013 | Salazar et al. | 463/16 |
| 2013/0079087 A1 | 3/2013 | Brosnan | |
| 2013/0090173 A1 | 4/2013 | Kislyi | |
| 2013/0095914 A1 | 4/2013 | Allen | |
| 2013/0124361 A1 | 5/2013 | Bryson | |
| 2013/0173393 A1 | 7/2013 | Calman | |
| 2013/0210511 A1 | 8/2013 | LaRocca | |
| 2013/0217489 A1 | 8/2013 | Bendayan | |
| 2013/0226733 A1 | 8/2013 | Evans | |
| 2013/0244767 A1 | 9/2013 | Barclay | |
| 2013/0288757 A1 | 10/2013 | Guthridge | |
| 2013/0290147 A1 | 10/2013 | Chandra | |
| 2013/0303726 A1 | 11/2013 | Mozzarelli | |
| 2013/0310164 A1 | 11/2013 | Walker | |
| 2014/0004884 A1 | 1/2014 | Chang | |
| 2014/0033262 A1 | 1/2014 | Anders | |
| 2014/0038679 A1 | 2/2014 | Snow | |
| 2014/0067526 A1 | 3/2014 | Raju | |
| 2014/0067544 A1 | 3/2014 | Klish | |
| 2014/0073436 A1 | 3/2014 | Takagi | |
| 2014/0087864 A1 | 3/2014 | Togashi | |
| 2014/0089048 A1 | 3/2014 | Bruich | |
| 2014/0100020 A1 | 4/2014 | Carroll | |
| 2014/0106858 A1 | 4/2014 | Constable | |
| 2014/0128137 A1 | 5/2014 | Balise | |
| 2014/0157314 A1 | 6/2014 | Roberts | |
| 2014/0206452 A1 | 7/2014 | Bambino | |
| 2014/0243072 A1 | 8/2014 | Santini | |
| 2014/0274359 A1 | 9/2014 | Helava | |
| 2014/0295958 A1 | 10/2014 | Shono | |
| 2014/0315616 A1 | 10/2014 | Avin | |
| 2014/0329585 A1 | 11/2014 | Santini | |
| 2014/0337259 A1 | 11/2014 | Lamb | |
| 2015/0011286 A1 | 1/2015 | Kim | |
| 2015/0019349 A1 | 1/2015 | Milley | |
| 2015/0087378 A1 | 3/2015 | Louie | |
| 2015/0306494 A1 | 10/2015 | Pieron | |
| 2015/0335995 A1 | 11/2015 | McLellan | |
| 2015/0352436 A1 | 12/2015 | Pieron | |

FOREIGN PATENT DOCUMENTS

| | | |
|---|---|---|
| WO | 2013013281 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

"Quest item—WoWWiki—Your guide to the World of Warcraft", printed from http://www.wowwiki.com/Quest_Item, Retrieved on Apr. 16, 2014, 1 page.

"Behavioural Analytics & Campaigning", http://lotaris.com/behavioural_analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Guild Housing System—FlyFF Wiki", http://flyff-wiki.gpotato.com/wiki/Guild_Housing_System, printed Dec. 5, 2013, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest: A_Little_Extra_Never_Hurts_--_Part_1&oldid=399597, http://lotro-wiki.com/index.php?title=Quest: A_Little_Extra_Never_Hurts_-_Part_2 &oldid=399366, http://lotro-wiki.com/index.php?title=Getting_Started&oldid=349681, Links are to used articles.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>, <http://lotrowiki.com/index.php?title=Ouest:A_Little_Extra_Never_Hurts_--_Part_1 &oldid=399597> (28 pgs).

"Rest—WoWWiki—Your guide to the World of Warcraft", printed from http://www.wowwiki.com/Rest, May 19, 2014, 2 pages.

"Warcraft II: Tides of Darkness". Wikipedia.org. Online. Accessed via the Internet. Accessed Aug. 9, 2014. <URL: http://en.wikipedia.org/wiki/Warcraft_11:_Tides_of_Darkness>, 10 pages.

(56) References Cited

OTHER PUBLICATIONS

City Coins. Cityville Wikia. Online. Accessed via the Internet. Accessed Aug. 9, 2014. <URL: http://cityville.wikia.com/wiki/City_Coins>, 2 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 10 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Elsword—Wikipedia, the free encyclopedia, URL: en.wikipedia.org/wiki/Elsword [Retrieved Feb. 21, 2013], 6 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Gem System—Street Fighter X Tekken, http://www.streetfighter.com/us/sfxtk/features/gem-system, printed Nov. 6, 2012, 6 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf,on May 26, 2015, 16 pages.
Katkoff, Michail, "Clash of Clans—the Winning Formula", Sep. 16, 2012, retrieved from Internet on Sep. 30, 2015 from URL (http://www.deconstructoroffun.com/2012/09/clash-of-clans-winning-formula.html>, 13 pages.
MapleStory, Internet guide: http://maplestory.nexon.net/guides/game-play/systems/00F1k/, http://maplestory.nexon.net/guides/game-play/systems/00Flk, http://maplestory.nexon.net/guides/game-play/systems/00ffv, Sep. 28, 2012, 12 pages.
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL: maplestory.nexon.net/guides/game-play/systems/OOFlk/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
Path of Exile, Internet posting: http://web.archive.org/web/20120606004658/http://www.pathofexile.com/forum/view-thread/12056, Nov. 16, 2011, 52 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Profession—WoWWiki—Your guide to the World of Warcraft, URL: http://www.wowwiki.com/Profession, printed Nov. 6, 2012, 8 pages.
Super Mario Bros. 3, NES Gameplay, http://www.youtube.com/watch?v=82TL-Acm4ts, 1 page.
Super Mario Bros. 3, StrategyWiki, the video game walkthrough and strategy guide, http://strategywiki.org/wiki/Super_Mario_Bros._3, 4 pages.
Super Mario Bros. 3 Review, Nintendo for NES, Feb. 1990, pp. 1-4.
TFF Challenge—UC Davis, http://tffchallenge.com/team/uc-davis/, printed Jan. 15, 2014, 12 pages.
TFWiki "teamfortress wiki" available Nov. 5, 2011 retrieved from https://web.archive.org/web/20111105044256/http://wiki.teamfortress.com/wiki/Loadout, 4 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

* cited by examiner

SYSTEM AND METHOD FOR A MULTI-PRIZE MYSTERY BOX THAT DYNAMICALLY CHANGES PROBABILITIES TO ENSURE PAYOUT VALUE

FIELD

The disclosure relates to a multi-prize mystery box that dynamically changes probabilities to ensure payout value in an online game.

BACKGROUND

In various online games, players pay to purchase mystery boxes for in-game use. The mystery boxes may have multiple unrevealed virtual items that are worth different amounts of virtual currency and/or real currency. Upon purchase of the mystery box, the virtual items are revealed to the player. Sometimes a player may receive a mystery box with multiple items that overall has a value less than what the user paid. If this continues to occur, the player may become frustrated and stop paying to purchase mystery boxes.

SUMMARY

One aspect of the disclosure relates to a multi-prize mystery box that dynamically changes probabilities to ensure payout value in an online game. The multi-prize mystery box which dynamically changes probabilities may provide the ability to arrange multiple items in a mystery box. The probability of acquiring an instance of the second item through Nth item may be dynamically weighted based on the value of the first item.

A system configured to implement a multi-prize mystery box that dynamically changes probabilities to ensure payout value in an online game may include one or more processors configured to execute compute program modules. The program modules may comprise a game module, a user module, a network module, a shop module, a probability module, a distribution determination module, and/or any other modules.

The game module may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

A user module may be configured to store inventories of items that are available to the users in the game space. The inventories may include a first inventory of items available to a first user in the game space. The items may include a first virtual item and/or any other item. A virtual item may be an item that can be used in the game instance by the user. For example, a virtual item may be used to assist a player's character and/or the player's instance of their virtual game (e.g., realm-type games), and/or in other ways. Examples of virtual items include, but are not limited to, resources, currency, valuables (money, valuable metals or gems, etc.), weapons, spell components, defense components, armor, mounts, pets, attire, power ups, and/or other items.

A store module may be configured to present, through a store interface, offers to sell container instances of virtual containers, the offers including a first offer to sell an instance of a first virtual container at a first price. The virtual containers may be associated with sets of potential items.

The first virtual container may be associated with a first set of potential items and/or any other items. The first set of potential items may include a first potential item and a second potential item and/or any other potential items. In some implementations, the "inventory" of virtual items may include virtual containers. As an example, virtual containers may include boxes, chests, bundles, packages, or other items that at least "appear" to store or contain one or more virtual items. Activation of a container instance of a virtual container may include "opening," "unwrapping," "turning on," or other action perform with respect to the container instance by a user to obtain or for a chance to obtain one or more virtual items. Potential items may be any virtual item the user has the probability of acquiring through a virtual container.

A probability module may be configured to obtain probabilities associated with the individual potential virtual items for container instances of the virtual containers purchased by the users. The probability module may obtain a first probability for the first potential item for a first container instance of the first virtual container purchased by a first user and/or any other user. The probability module may obtain a second probability for the second potential item for the first container instance purchased by the first user and/or any other user.

The probability module may be further configured such that obtaining the probabilities for the first set of potential items for the first container instance may comprise adjusting the probabilities based on past distributions through the first container instance. Responsive to an item instance of the first potential item being distributed through the first container instance to the first user, the probability for the second potential item for the first container instance may be adjusted based on a value of the first potential item and a value of the second potential item and/or any other item.

The probability module may be configured such that the value of the second item is determined based on a cost of the second item, a rareness of the second item, and/or a utility of the second item. The probability module may be configured to adjust the probabilities for the items in the first set of potential items to enhance the likelihood that an aggregate value of the items distributed by the first container instance may surpass a minimum aggregate value and/or any other value. The probability module may be configured such that the minimum aggregate value may be determined based on the first price, and/or the minimum aggregate value may be the first price.

The probability module may be configured such that responsive to the value of the first potential item being high in relation to the values of the other potential items in the first set of potential items, responsive to the value of the second potential item being low in relation to the values of the other potential items in the first set of potential items, and further responsive to distribution of an item instance of the second potential item through the first container instance, the probability for the first potential item may be adjusted higher to enhance the likelihood that the first container instance may distribute an item instance of the first potential item to enhance an aggregate value of the items distributed by the first container instance and/or any other container instance.

The probability module may be configured to adjust probabilities for the items in the first set of potential items to enhance the likelihood that an aggregate value of the items distributed by the first container instance may not surpass a maximum aggregate value and/or any other value.

The probability module may be configured such that the maximum aggregate value is determined based on the first price and/or any other price.

A distribution determination module may be configured to receive activation requests from users for container instances purchased by the users. The distribution determination module responsive to the activation requests may determine which potential items should be distributed to the users within the game space through the container instances. The determination may be made based on the probabilities obtained by the probability module such that the distribution determination module determines which potential item in the first set of potential items may be distributed to the first user through the first container instance in response to an activation request from the first user for the first container instance and/or any other container instance. The determination of which potential item in the first set of potential items may be based on the probabilities for the potential items in the first set of potential items for the first container instance obtained by the probability module and/or any other module.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
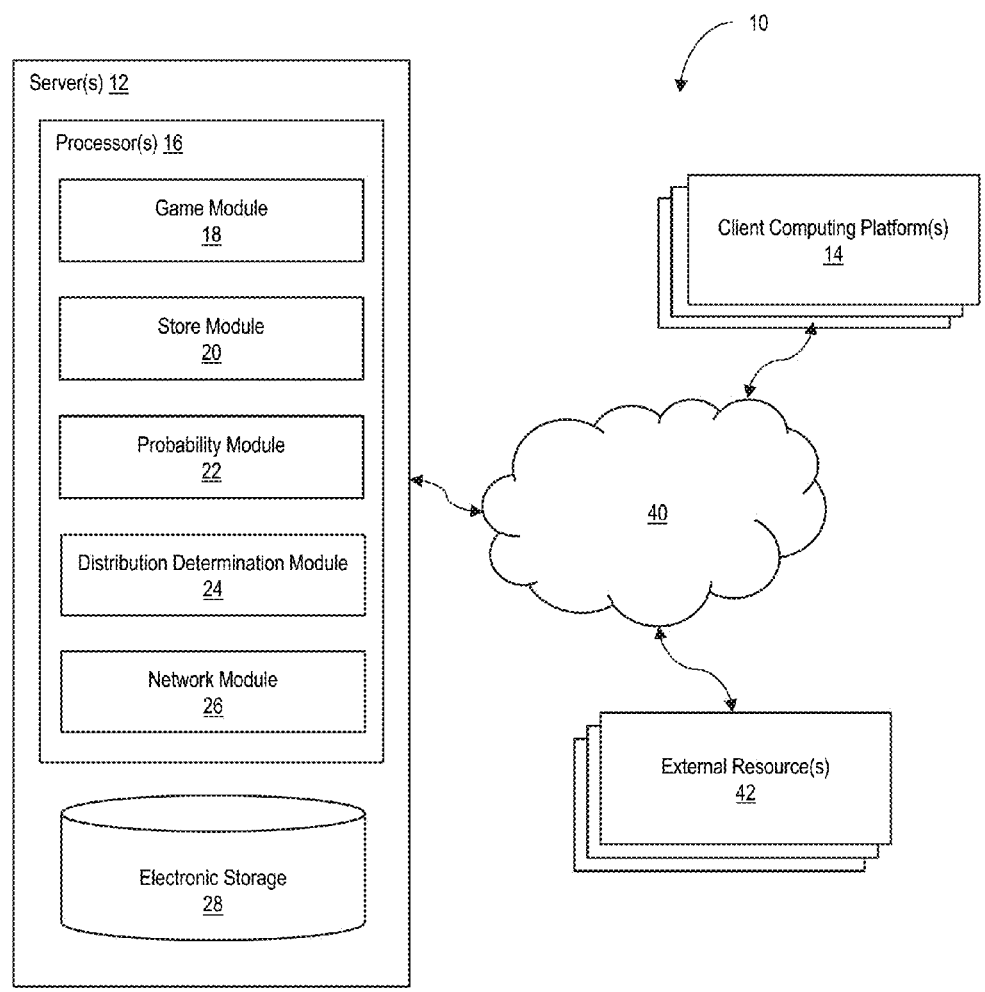
FIG. 1 illustrates an exemplary system configured to implement a multi-prize mystery box that dynamically changes probabilities to ensure payout value in an online game, according to an aspect of the invention.

FIG. 1 illustrates a system 10 configured to dynamically adjust prizes or awards based on a platform in an online game, according to an aspect of the invention. The program modules may comprise a game module 18, a user module, a store module 20, a probability module 22, a distribution determination module 24, a network module 26, and/or any other modules. In some implementations, system 10 may include a game server(s) 12. The game server(s) 12 may host a game space in which an online game takes place. The game server(s) 12 may be configured to communicate with one or more client computing platform(s) 14 according to a client/server architecture. The users may access system 10 and/or the game space via client computing platform(s) 14.

The game server(s) 12 may be configured to execute one or more computer program modules. The computer program modules may include one or more of a game module 18, a user module, a store module 20, a probability module 22, a distribution determination module 24, a network module 26, and/or any other modules.

The game module 18 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users. The users may include a first user that accesses the game through multiple game platforms including a first game platform and a second game platform and/or any other game platform. Platforms may include hardware platforms, operating system platforms, software platforms, and/or other platforms.

In some implementations, hardware platform may include different types of systems in general (e.g., mainframe, workstation, desktop, handheld and/or embedded) and/or the specific type of processor (e.g., x86, SPARC, PowerPC and/or Alpha). Game platforms may include online services through which users access online games and/or other resources. The game platforms may provide authentication, social graph information, demographic information, and/or other information to the games and/or other resources. The game platforms may be accessed by users through websites and/or other online media. Examples of online game platforms include, for example, Facebook, battle.net, Twitter, zynga.com, Kabam.com, Google Plus, iTunes/iOS, Google Play, and/or other online platforms.

The game module 18 may be configured to implement the instance of the game space executed by the computer modules to determine state of the game space. The state may then be communicated (e.g., via streaming visual data, via object/position data, and/or other state information) from server(s) 12 to client computing platform(s) 14 for presentation to users. The state determined and transmitted to a given client computing platform(s) 14 may correspond to a view for a user character being controlled by a user via the given client computing platform(s) 14. The state determined and transmitted to a given client computing platform(s) 14 may correspond to a location in the game space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the game space may comprise a simulated space that is accessible by users via clients (e.g., client computing platform(s) 14) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the game space is determined by game module 18 is not intended to be limiting. The game module 18 may be configured to express the game space in a more limited, or more rich, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space executed by game module 18, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

The users may participate in the instance of the game space by controlling one or more of the available user controlled elements in the game space. Control may be exercised through control inputs and/or commands input by the users through client computing platform(s) 14. The users may interact with each other through communications exchanged within the game space. Such communications may include one or more of textual chat, instant messages, private messages, voice communications, and/or other communications. Communications may be received and entered by the users via their respective client computing platform(s) 14. Communications may be routed to and from the appropriate users through server(s) 12 (e.g., through game module 18).

The system may comprise a user module configured to store inventories of virtual items that are available to users in the game space. The inventories may include a first inventory and/or any other inventory of virtual items available to a first user in the game space. The user module may be configured to access and/or manage one or more user profiles and/or user information associated with users of the system 10. The one or more user profiles and/or user information may include information stored by game server(s) 12, one or more of the client computing platform(s) 14, and/or other storage locations. The user profiles may include, for example, information identifying users (e.g., a username or handle, a number, an identifier, and/or other identifying information) within the game space, security login information (e.g., a login code or password), game space account information, subscription information, virtual currency account information (e.g., related to currency held in credit for a user), relationship information (e.g., information related to relationships between users in the game space), game space usage information, demographic information associated with users, interaction history among users in the game space, information stated by users, purchase information of users, browsing history of users, a client computing platform identification associated with a user, a phone number associated with a user, and/or other information related to users.

The user module may be configured to store inventories of virtual items including resources that are available to users in the game space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

The user module may be configured to manage user profiles including user information related to participating in a game through multiple modules. The user information may include user information for the first user that describes interaction of the first user with the game through the first platform and the second platform and/or any other platform. User information may be stored in user accounts and/or profiles. User accounts may be an account on a video game central server or within a peer-to-peer network that contains a user profile including personal, billing, and character account information. A user attribute may be any attribute that can be applied to a user account. User attributes may include, but not be limited to: real currency, discount of monthly fees for playing game, monthly fee for playing a game, interest rates for use of or borrowing real or virtual cash amounts, global character attribute settings for all characters created by player across multiple games, rewards for encouraging another player to sign up to play and/or any other attributes.

The interaction module may be configured to monitor interactions of the users with the game space and/or each other within the game space. This may include monitoring, for a given user, one or more of times at which the given user is logged in to the game space, areas of the game space the given user views or interacts with or in, other users the given user interacts with, the nature and/or content of interactions of the given user with other users, activities participated in within the game space, level, powers, or skill attained in the game space, inventory items obtained in the game space, and/or other interactions of the given user with the game space and/or other users. Some or all of the information generated by interaction module in monitoring the interactions of the users may be stored to the user profiles managed by user module.

At a given time, interaction module may determine a set of users that are currently engaged with the game space and/or a set of users that are currently not engaged with the game space. Being engaged with the game space may refer to being logged in to the game space, performing some action or interaction within the game space within some period of time (e.g., the last 2 minutes), and/or other taking some other action indicating ongoing and contemporaneous engagement with the game space.

The interaction module may be configured to determine, for individual users, an activity metric that indicates an activity level within the game space. The activity metric may be determined based on one or more of log in frequency, amount of time logged in to the game space within a rolling time period (e.g., over the last day, week, month, or other rolling time period), average amount of time logged in to the game space over some length of time (e.g., per day, per week, and/or other length of time), average log in session time over a rolling time period, number of inter-user communications over a length of time, number of inter-user communications per log in, number of relationships with other users in the game space, number of new relationships with other users in the game space within a rolling time period, amount of real world money spent in the game space, and/or other activity parameters.

A store module 20 may be configured to present, through a store interface, offers to sell container instances of virtual containers, the offers including a first offer to sell an instance of a first virtual container at a first price. The virtual containers may be associated with sets of potential items. The first virtual container may be associated with a first set of potential items and/or any other items. The first set of potential items may include a first potential item and a second potential item and/or any other potential items. In some implementations, the "inventory" of virtual items may include virtual containers. As an example, virtual containers may include boxes, chests, bundles, packages, or other items that at least "appear" to store or contain one or more virtual items. Activation of a container instance of a virtual container may include "opening," "unwrapping," "turning on," or other action perform with respect to the container instance by a user to obtain or for a chance to obtain one or more virtual items. Potential items may be any virtual item the user has the probability of acquiring through a virtual container.

A store module 20 may be configured to present a store interface to the users. The store interface may present offers to users to buy item instances of virtual items. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module 20 may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module 20 may be configured such that the offers presented to the first user may be restricted to offers having prices in a first price range. The first price range may be determined based on the user metric for the first user, and/or the user metric for other users. The store module 20 may be configured such that the first price range may change as participation by the first user in the game causes the user metric for the first user to change. The store module 20 may be configured such that the first price range may be bounded by one or more both of a minimum value and/or a maximum value. The store module 20 may be configured such that the offers having prices below the minimum value may not be available for purchase by the first user. The store module 20 may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

A probability module 22 may be configured to obtain probabilities associated with the individual potential virtual items for container instances of the virtual containers purchased by the users. The probability module 22 may obtain a first probability for the first potential item for a first container instance of the first virtual container purchased by a first user and/or any other user. The probability module 22 may obtain a second probability for the second potential item for the first container instance purchased by the first user and/or any other user.

The probability module 22 may be further configured such that obtaining the probabilities for the first set of potential items for the first container instance may comprise adjusting the probabilities based on past distributions through the first container instance. Responsive to an item instance of the first potential item being distributed through the first container instance to the first user, the probability for the second potential item for the first container instance may be adjusted based on a value of the first potential item and a value of the second potential item and/or any other item.

The probability module 22 may be configured such that the value of the second item is determined based on a cost of the second item, a rareness of the second item, and/or a utility of the second item. The probability module 22 may be configured to adjust the probabilities for the items in the first set of potential items to enhance the likelihood that an aggregate value of the items distributed by the first container instance may surpass a minimum aggregate value and/or any other value. The probability module 22 may be configured such that the minimum aggregate value may be determined based on the first price, and/or the minimum aggregate value may be the first price.

Allowing users to acquire virtual objects or virtual items according to the invention instead of the traditional points greatly enhances the entertainment value for a number of reasons. First, users will tend to actively seek out virtual items with certain attributes that they desire, and to avoid attributes they do not. Moreover, because some attributes can be considered more desirable than others, users can be highly motivated to look for virtual items with certain attributes. Other virtual items, no matter how many, will not satisfy the user's needs. Also, unlike points, some virtual may be rare, or supplied in limited numbers, which makes them more valuable simply due to their rareness. In some implementations, some virtual items may only be acquired through mystery boxes, which may encourage users to purchase more mystery boxes. According to other aspects, the system can be made such that a combination of certain virtual items is particularly advantageous to possess.

The probability module 22 may be configured such that responsive to the value of the first potential item being high in relation to the values of the other potential items in the first set of potential items, responsive to the value of the second potential item being low in relation to the values of the other potential items in the first set of potential items, and further responsive to distribution of an item instance of the second potential item through the first container instance, the probability for the first potential item may be adjusted higher to enhance the likelihood that the first container instance may distribute an item instance of the first potential item to enhance an aggregate value of the items distributed by the first container instance and/or any other container instance.

The probability module 22 may be configured to adjust probabilities for the items in the first set of potential items to enhance the likelihood that an aggregate value of the items distributed by the first container instance may not surpass a maximum aggregate value and/or any other value. The probability module 22 may be configured such that the maximum aggregate value is determined based on the first price and/or any other price.

In some implementations the probability of obtaining a certain cost (e.g., more expensive item vs. less expensive item) of the second item in the box through the nth item in the box may depend on the overall cost of the box and the value of the first item in the box.

Games allow users to pay to receive mystery boxes for in-game use. The mystery boxes may have multiple virtual items that are worth different amounts. Sometimes a user will receive a mystery box with multiple items that overall has a value less than what the user paid. If this continues to occur, the user will become frustrated and stop paying to purchase mystery boxes.

With any chance based system, when a user purchases a mystery box some items may be more valuable and some are less valuable. When a user continually purchases a mystery box and continues to receive less valuable items, a user may be discouraged to continue purchasing mystery boxes. In some implementations, the probability of obtaining a particular value of the second item through Nth item be dynamically weighted based on the value of the first item.

For example, if the user pays $1.00 for the mystery box and the first prize by chance is only worth $0.10, there may be a higher probability that the combined value of the subsequent items (e.g., second, third, fourth, etc.) will be worth at least $0.90. The items that arise subsequently may be either higher or lower based on the cost of the box and the value of the first item. The values of the subsequent items may be dynamically changed based on the value of the first item.

In some implementations, the system could provide allowing the user the ability to swap out at least one item in the mystery box for a second random chance of obtaining something better. The second chance may be randomly determined, and may provide a more valuable item, or a less valuable item.

A distribution determination module 24 may be configured to receive activation requests from users for container instances purchased by the users. The distribution determination module 24 responsive to the activation requests may determine which potential items should be distributed to the users within the game space through the container instances. The determination may be made based on the probabilities obtained by the probability module such that the distribution determination module 24 determines which potential item in the first set of potential items may be distributed to the first user through the first container instance in response to an activation request from the first user for the first container instance and/or any other container instance. The determination of which potential item in the first set of potential items may be based on the probabilities for the potential items in the first set of potential items for the first container instance obtained by the probability module and/or any other module.

Network module 26 of the game server(s) 12 may be configured to maintain a connection to the one or more client computing platforms 14. For example, the network module 26 may maintain one or more communication lines or ports to enable connection and/or exchange of information with a network 30 and/or other computing platforms 14. Information such as state information, game state and game logic may be communicated via network module. The network module 26 may be configured to receive information from the client computing platform(s) 14 as well.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The game server(s) 12, client computing platform(s) 14, and/or external resource(s) 42 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 42 may be operatively linked via some other communication media.

Game server(s) 12 may include electronic storage 28, one or more processors 16, and/or other components. Game server(s) 12 may include communication lines, or ports to enable the exchange of information with a network 30 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 28 may comprise non-transitory storage media that electronically stores information. The electronic storage media of electronic storage 28 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24 and/or 26. Processor(s) 16 may be configured to execute modules 18, 20, 22, 24 and/or 26 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24 and/or 26 are illustrated in FIG. 1 as being implemented within a single processing unit, in implementations in which processor includes multiple processing units, one or more of modules 18, 20, 22, 24 and/or 26 may be implemented remotely from the other modules. The description of the functionality provided by the different modules 18, 20, 22, 24 and/or 26 described below is for illustrative purposes, and is not intended to be limiting, as any of modules 18, 20, 22, 24 and/or 26 may provide more or less functionality than is described. For example, one or more of modules 18, 20, 22, 24 and/or 26 may be eliminated, and some or all of its functionality may be provided by other ones of modules 18, 20, 22, 24 and/or 26. As another example, processor 16 may be configured to execute one or more additional modules that may perform some or all of the functionality attributed below to one of modules 18, 20, 22, 24 and/or 26.

A given client computing platform(s) 14 may include one or more processors configured to execute computer program modules. The computer program modules may be configured to enable an expert or user associated with the given client computing platform(s) 14 to interface with system 10, game server(s) 12, and/or external resource(s) 42, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 42 may include sources of information, hosts and/or providers of game space s outside of system 10, external entities participating with system 10, and/or other resources. In some implementations, some or all of the functionality attributed herein to external resource(s) 42 may be provided by resources included in system 10.

Figure 2:
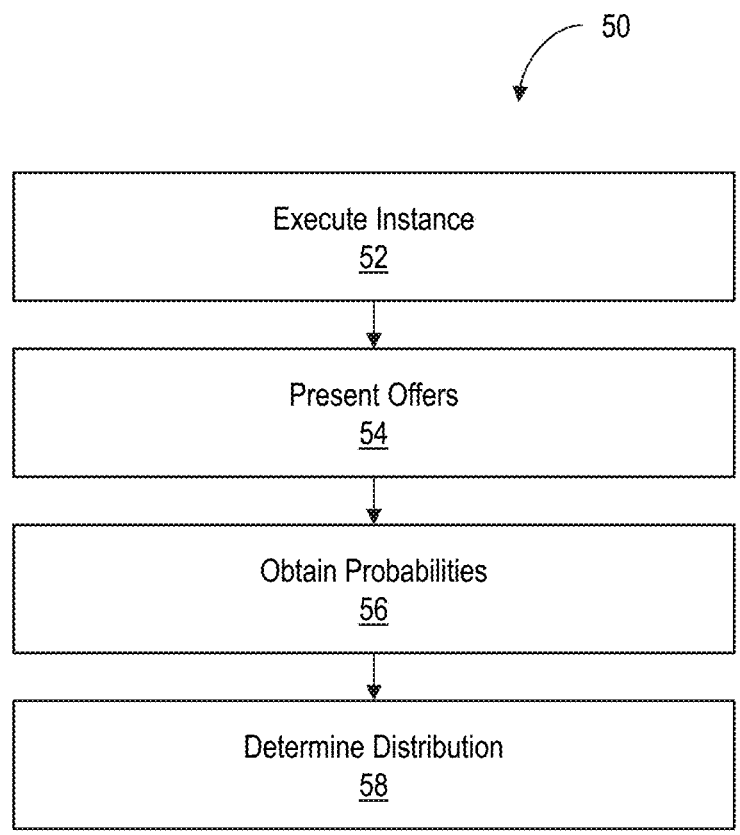
FIG. 2 illustrates an exemplary method of implementing a multi-prize mystery box that dynamically changes probabilities to ensure payout value in an online game, according to an aspect of the invention.

FIG. 2 illustrates an exemplary method of implementing a multi-prize mystery box that dynamically changes probabilities to ensure payout value in an online game, according to an aspect of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a game space may be executed. In some implementations, operation 52 may be performed by a game module the same as or similar to game module 18 (shown in FIG. 1 and described above).

At an operation 54, the executed instance of the game space may be implemented to present offers. A store interface may present offers to sell container instances of virtual containers, the offers including a first offer to sell an instance of a first virtual container at a first price. The virtual containers may be associated with sets of potential items. The first virtual container may be associated with a first set of potential items and/or any other items. In some implementations, operation 54 may be performed by a store module the same as or similar to store module 20 (shown in FIG. 1 and described above).

At an operation 56, probabilities may be obtained. Probabilities associated with the individual potential virtual items for container instances of the virtual containers purchased by the users may be obtained. In some implementations, operation 56 may be performed by a probability module the same as or similar to the probability module 22 (shown in FIG. 1 and described above).

At an operation 58, the distributions may be determined. Activation requests from users for container instances purchased by the users may be determined. In some implementations, operation 58 may be performed by a distribution determination module the same as or similar to the distribution determination module 24 (shown in FIG. 1 and described above).

FIGS. 3A-3G illustrates an exemplary diagram of a user interface 70 which implements a multi-prize mystery box that dynamically changes probabilities to ensure payout value in an online game, according to an aspect of the invention.

Figure 3A:
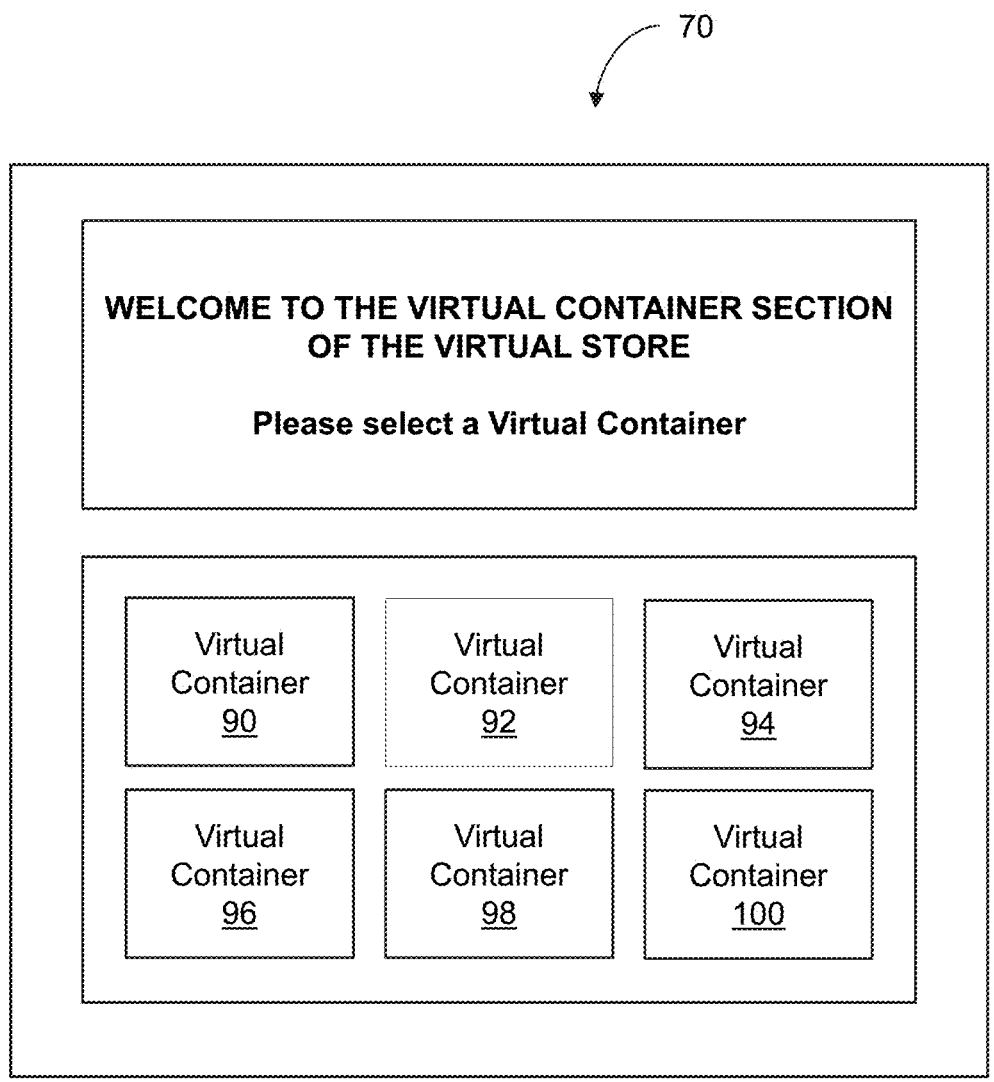
FIGS. 3A-3G illustrates an exemplary diagram of a user interface which implements a multi-prize mystery box that dynamically changes probabilities to ensure payout value in an online game, according to an aspect of the invention.
Figure 3B:
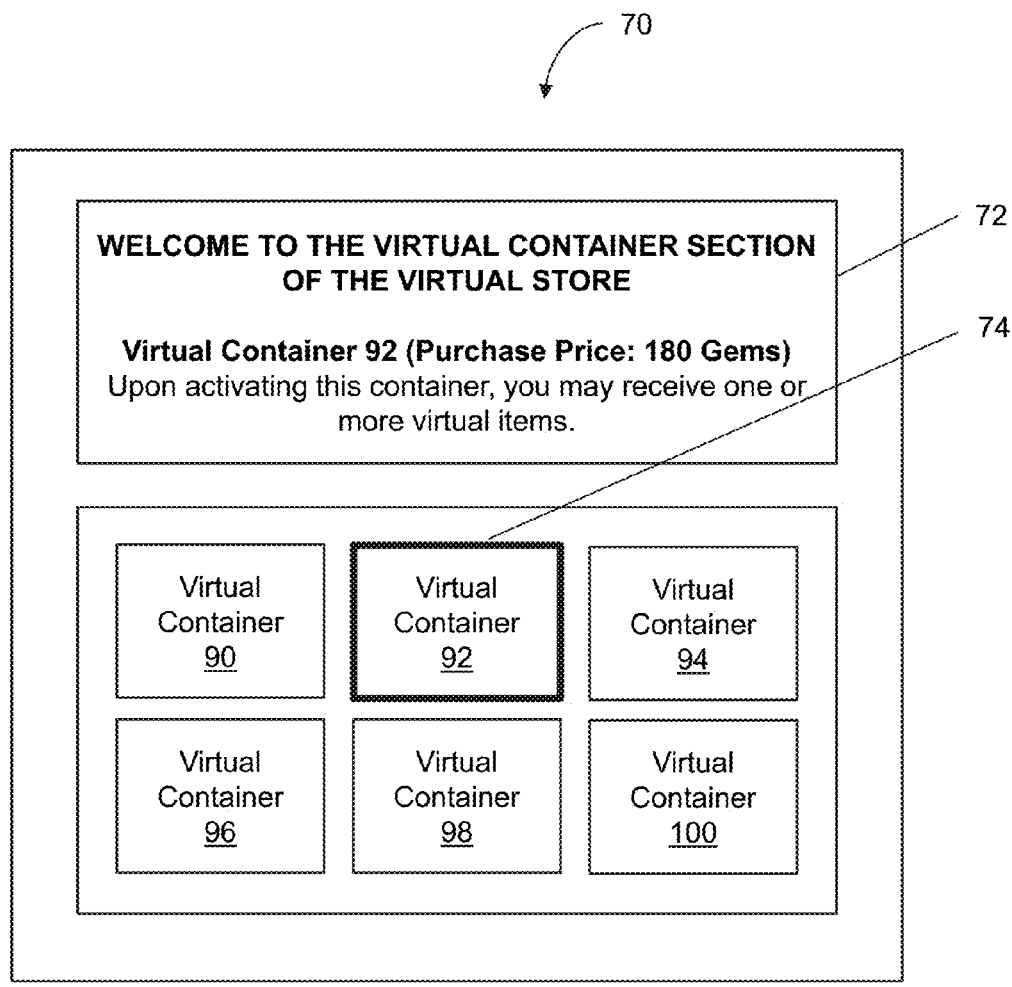
Figure 3C:
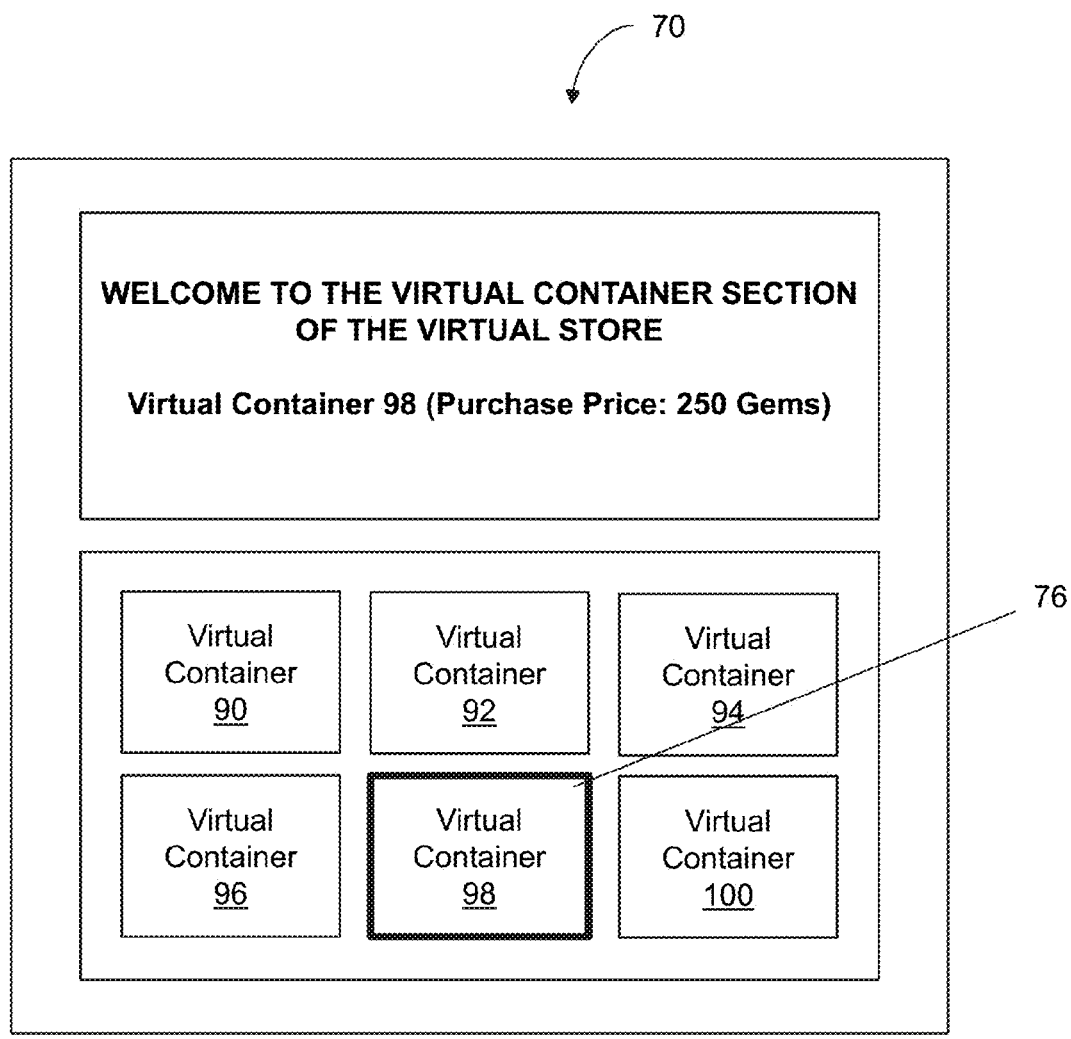

FIG. 3A illustrates an exemplary implementation of a user interface 70 allowing a user to input selection of a container instance of a virtual container. In some implementations, with respect to FIG. 3B, a container instance of virtual container 92 may be associated by price module 72 with a price of 180 Gems. The price of 180 Gems to purchase a container instance of virtual container 92 may be based the probability of obtaining items greater than or equal to the value of virtual items within the container. FIG. 3C illustrates an exemplary implementation of a user interface 70 allowing a user to input selection of a container instance of a virtual container. In this example, virtual container 98 may be selected 76 for a price of 250 gems.

Gems may be considered a type of virtual currency in the game. In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some implementations, virtual currency can be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit.

Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

In some implementations, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Figure 3D:
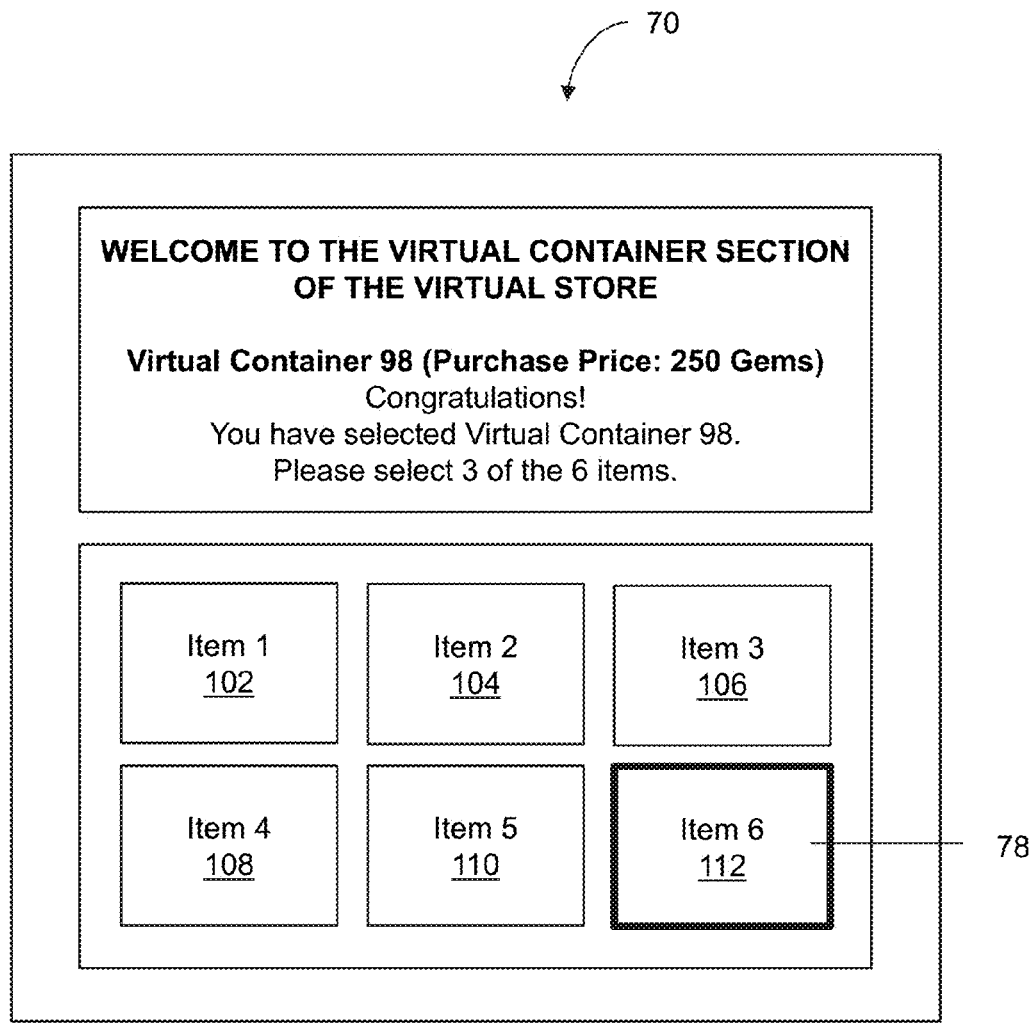

In some implementations, after a user has selected a virtual container, the users may select virtual items within the virtual container. In some implementations, virtual items within the virtual container may be automatically selected. In FIG. 3D, a user is allowed to select 3 of the 6 items presented. In some implementations, a user may select 78 Item 6 112.

Figure 3E:
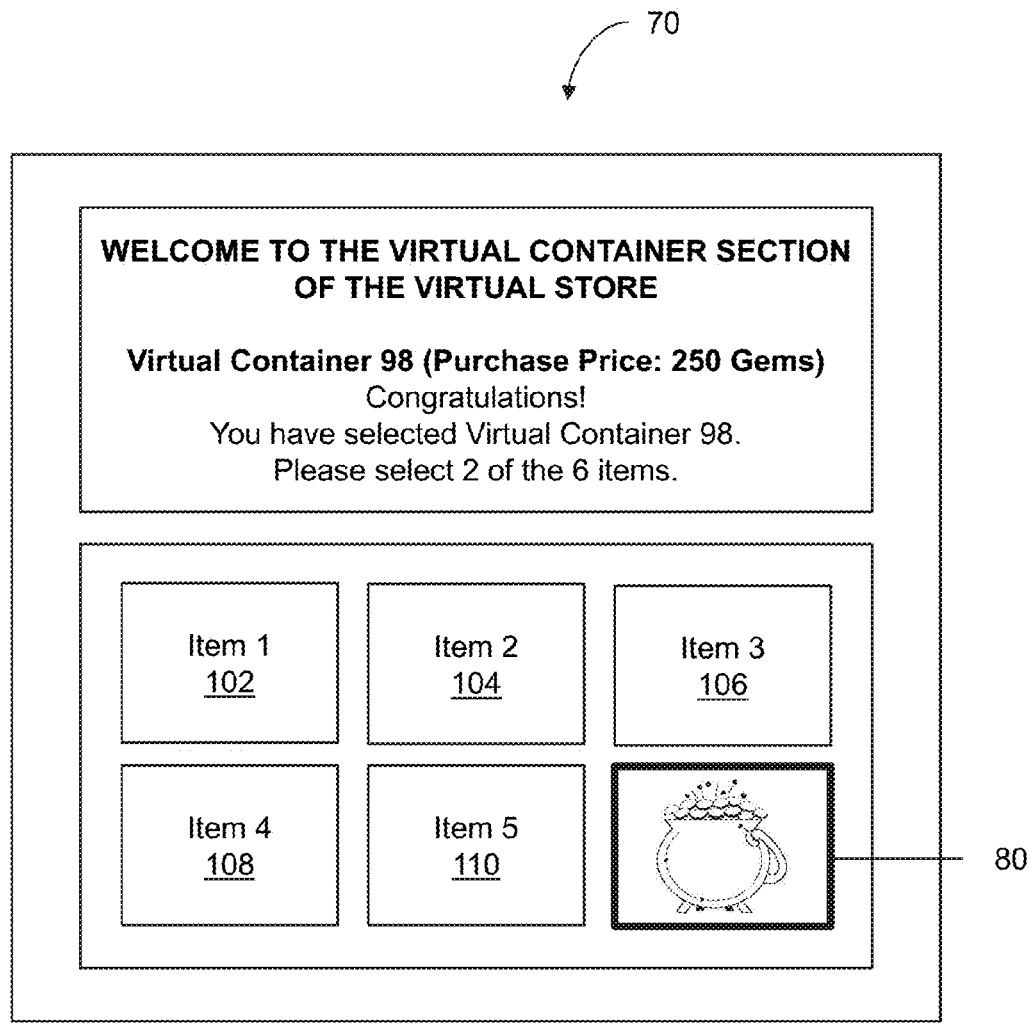

FIG. 3E illustrates the type of virtual item uncovered by the player. The virtual item may be any type of in-game matter. Various matters may be collected in an inventory. These matters may include, but are not limited to, virtual items, virtual resources, character attributes, and/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Figure 3F:
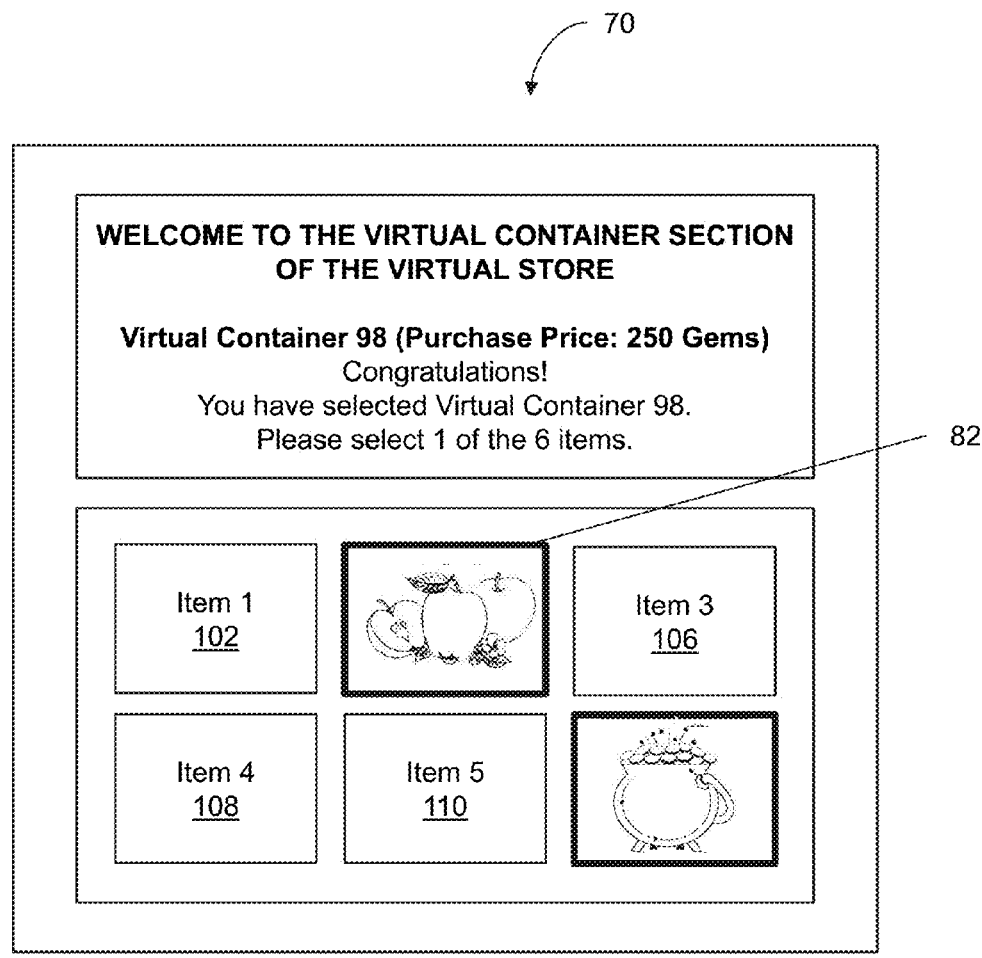
Figure 3G:
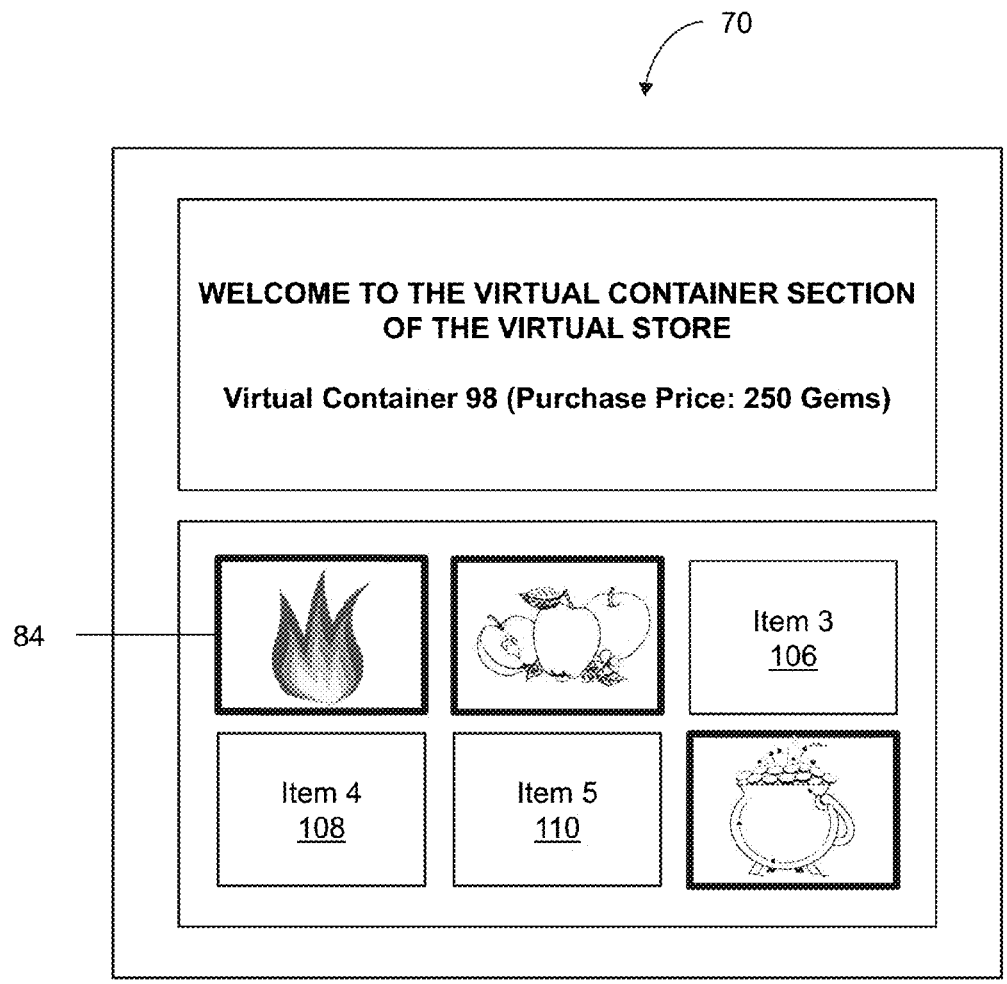

In FIG. 3F, a user may select an additional 2 items. In some implementations, a user may select 82 Item 2 104. In FIG. 3F, a user may select an additional 1 items. In some implementations, a user may select 84 Item 1 102. In some implementations, the probability of obtaining the food and the fire may have been based on the cost of the virtual container, which was 250 gems, and the value of the gold, which was the first item selected. For example, if the user pays 250 gems for the mystery box and the first prize (e.g., gold) by chance is only worth 50 gems, there may be a higher probability that the combined value of the subsequent items (e.g., food, fire, etc.) will be worth at least 200 gems. The items that arise subsequently may be either higher or lower based on the cost of the box and the value of the first item. The values of the subsequent items may be dynamically changed based on the value of the first item.

Figure 4:
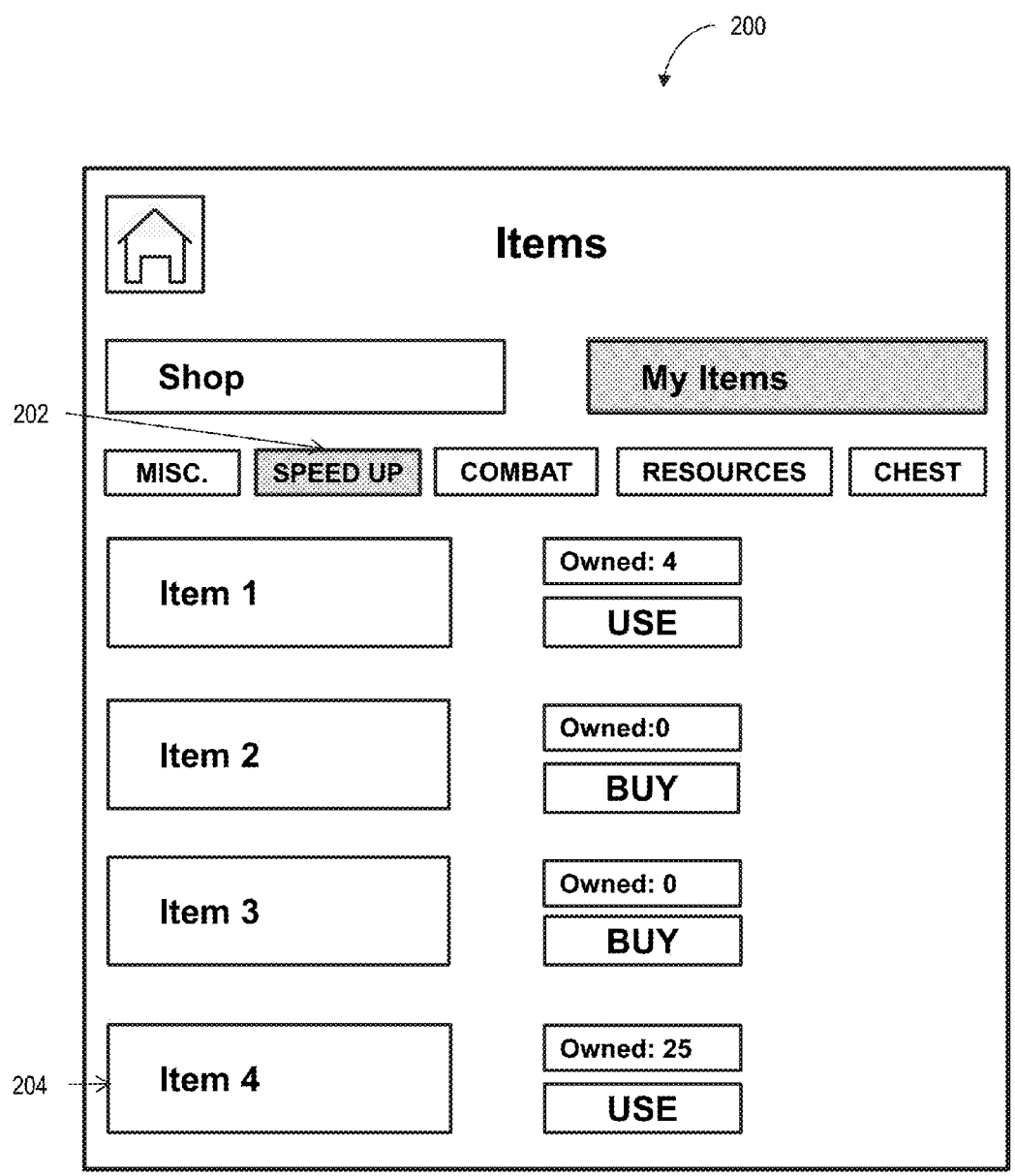
FIG. 4 illustrates an exemplary diagram of a user interface which implements a multi-prize mystery box that dynamically changes probabilities to ensure payout value in an online game, according to an aspect of the invention.

FIG. 4 illustrates an exemplary diagram of a user interface 200 which implements a multi-prize mystery box that dynamically changes probabilities to ensure payout value in an online game, according to an aspect of the invention. In some implementations, the user may select the "my items" tab, and select from a category 202 of virtual in-game goods to use in game. In some implementations, the categories may include one or more: miscellaneous, speed up, combat, resources, chest, and/or any other category. Each category contains lists of items 204 that a user owns and/or may use or purchase in game. The items won in the mystery box may be stored and displayed to the user so they have the option of when they want to implement the use of the item in the game.

Figure 5:
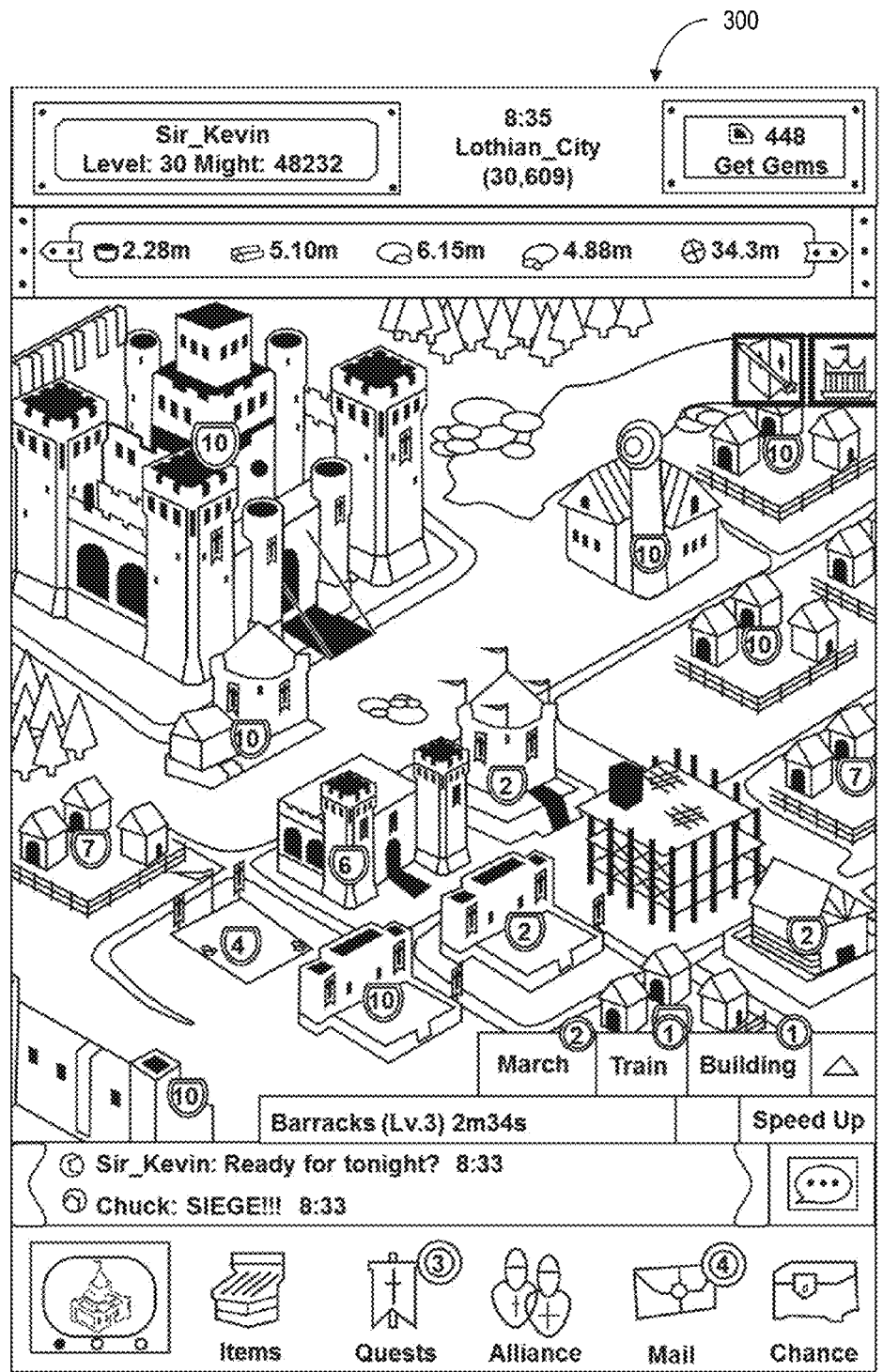
FIG. 5 illustrates an exemplary diagram of a user interface which implements a multi-prize mystery box that dynamically changes probabilities to ensure payout value in an online game, according to an aspect of the invention.

FIG. 5 illustrates an exemplary diagram of a user interface 300 which implements a multi-prize mystery box that dynamically changes probabilities to ensure payout value in an online game, according to an aspect of the invention. In some implementations, the user will select the chance 302 icon in order to purchase the mystery box. The user may also purchase the mystery box through the items icon. In some implementations, the user may only be allowed to purchase a mystery box after certain in-game tasks are completed. Once the user completes the task, the user may be presented an offer to purchase a mystery box.

Tasks shad include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income: earning a higher rank in an army; winning an election among two or more player characters; achieving deity or other status; improving player character status or caste; assisting other player characters with any of the above; speed of accomplishing or changing the rate or trends of any or all of the above.

Accomplishments shall include acquiring various matters. Various matters may be collected in an inventory. These matters may include, but are not limited to, virtual items, virtual resources, character attributes, end/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, end/or enchant other player characters.

The user maintains an inventory for the users character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

It would be understood by one of ordinary skill in the art that the interfaces may not be limited to the embodiment illustrated in FIGS. 3A-3G, 4, and 5. The interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating adjustments of probabilities associated with potential virtual items to be distributed to purchasers of virtual containers that are associated with the potential virtual items, the system comprising:

a server including one or more physical processors configured by machine-readable instructions to:

execute a game instance of a game space, and to use the game instance to generate game state information that is transmitted to client computing platforms over a network, the game state information facilitating presentation of views of the game space to users via the client computing platforms associated with the users, wherein execution of the game instance further enables interaction of the users with the game space and/or each other by performing operations in the game space in response to commands received over the network from the client computing platforms associated with the users;

effectuate presentation, through a store interface, of offers to sell container instances of virtual containers, the offers including a first offer to sell an instance of a first virtual container at a first price, the virtual containers being associated with sets of potential items such that the first virtual container is associated with a first set of potential items, the first set of potential items including a first potential item and a second potential item;

effectuate a purchase by a first user of a first container instance of the first virtual container;

obtain information regarding prior distributions to the users of item instances through the first virtual container, wherein the prior distributions correspond to prior purchases by the users of container instances of the first virtual container, and wherein the obtained information includes values of the prior distributions;

obtain probabilities associated with the individual potential virtual items for container instances of the virtual containers purchased by the users such that a first probability for the first potential item is obtained for the first container instance of the first virtual container purchased by the first user and a second probability for the second potential item for the first container instance purchased by the first user; and receive activation requests from users for container instances purchased by the users and, responsive to receiving the activation requests, determine which items in the sets of potential items should be distributed to the users within the game space through the container instances such that which first item in the first set of potential items should be distributed to the first user through the first container instance is determined in response to an activation request from the first user for the first container instance, the determination of which first item being based on the first probability;

adjust the second probability for the second potential item for the first container instance based on
(i) the first price,
(ii) a value of the first item, and
(iii) the values of the prior distributions;

determine which second item in the first set of potential items should be distributed to the first user through the first container instance, the determination of which second item being based on the adjusted second probability; and distribute the first item as determined to the first user and distribute the second item as determined to the first user.

2. The system of claim 1, wherein the value of the second item is determined based on a cost of the second item.

3. The system of claim 1, wherein the value of the second item is determined based on a rareness of the second item.

4. The system of claim 1, wherein the value of the second item is determined based on a utility of the second item.

5. The system of claim 1, wherein the one or more physical processors are configured by machine-readable instructions to adjust the probabilities for the items in the first set of potential items to enhance the likelihood that an aggregate value of the items distributed by the first container instance will surpass a minimum aggregate value.

6. The system of claim 5, wherein the one or more physical processors are configured by machine-readable instructions such that the minimum aggregate value is determined based on the first price.

7. The system of claim 6, wherein the one or more physical processors are configured by machine-readable instructions such that the minimum aggregate value is the first price.

8. The system of claim 1, wherein, responsive to the value of the first potential item being high in relation to the values of the other potential items in the first set of potential items, further responsive to the value of the second potential item being low in relation to the values of the other potential items in the first set of potential items, and further still responsive to distribution of an item instance of the second potential item through the first container instance, the probability for the first potential item is adjusted higher to enhance the likelihood that the first container instance will distribute an item instance of the first potential item to enhance an aggregate value of the items distributed by the first container instance.

9. The system of claim 1, wherein the one or more physical processors are configured by machine-readable instructions to adjust probabilities for the items in the first set of potential items to enhance the likelihood that an aggregate value of the items distributed by the first container instance will not surpass a maximum aggregate value.

10. The system of claim 9, wherein the one or more physical processors are configured by machine-readable instructions such that the maximum aggregate value is determined based on the first price.

11. The system of claim 1, wherein the one or more physical processors are configured by machine-readable instructions to:

effectuate presentation to the first user, through the store interface, of an opportunity to swap at least one of the distributed items subsequent to being determined; and responsive to the first user electing to take the opportunity, replace the at least one of the distributed items with a newly determined replacement item, wherein the newly determined replacement item is selected from the first set of potential items.

12. A computer implemented method for facilitating adjustments of probabilities associated with potential virtual items to be distributed to purchasers of virtual containers that are associated with the potential virtual items, the method being implemented in a computer system that includes a server including one or more physical processors configured by machine-readable instructions, the method comprising:

executing an instance of a game space, and using the instance of the game space to generate game state information that is transmitted to client computing platforms over a network, the game state information facilitating presentation of views of the online game to users via the client computing platforms associated with the users, wherein execution of the instance further enables interaction of the users with the game space and/or each other by performing operations in the game space in response to commands received over the network from the client computing platforms associated with the users;

presenting, through a store interface, offers to sell container instances of virtual containers, the offers including a first offer to sell an instance of a first virtual container at a first price, the virtual containers being associated with sets of potential items such that the first virtual container is associated with a first set of potential items, the first set of potential items including a first potential item and a second potential item;

effectuating a purchase by a first user of a first container instance of the first virtual container;

obtaining information regarding prior distributions to the users of item instances through the first virtual container, wherein the prior distributions correspond to prior purchases by the users of container instances of the first virtual container, and wherein the obtained information includes values of the prior distributions;

obtaining probabilities associated with the individual potential virtual items for container instances of the virtual containers purchased by the users such that the obtaining a first probability for the first potential item for the first container instance of the first virtual container purchased by the first user and a second probability for the second potential item for the first container instance purchased by the first user; and receiving activation requests from users for container instances purchased by the users and, responsive to the activation requests, determine which items in the sets of potential items should be distributed to the users within the game space through the container instances such that determining which first item in the first set of potential items should be distributed to the first user through the first container instance in response to an activation request from the first user for the first container instance, the determination of which first item being based on the first probability;

adjusting the second probability for the second potential item for the first container instance based on
  (i) the first price,
  (ii) a value of the first item, and
  (iii) the values of the prior distributions;

determining which second item in the first set of potential items should be distributed to the first user through the first container instance, the determination of which second item being based on the adjusted second probability; and distributing the first item as determined to the first user and distributing the second item as determined to the first user.

13. The method of claim 12, wherein the value of the second item is determined based on a cost of the second item.

14. The method of claim 12, wherein the value of the second item is determined based on a rareness of the second item.

15. The method of claim 12, wherein the value of the second item is determined based on a utility of the second item.

16. The method of claim 12, further comprising adjusting the probabilities for the items in the first set of potential items to enhance the likelihood that an aggregate value of the items distributed by the first container instance will surpass a minimum aggregate value.

17. The method of claim 16, wherein the minimum aggregate value is determined based on the first price.

18. The method of claim 17, wherein the minimum aggregate value is the first price.

19. The method of claim 12, wherein, responsive to the value of the first potential item being high in relation to the values of the other potential items in the first set of potential items, further responsive to the value of the second potential item being low in relation to the values of the other potential items in the first set of potential items, and further still responsive to distribution of an item instance of the second potential item through the first container instance, the probability for the first potential item is adjusted higher to enhance the likelihood that the first container instance will distribute an item instance of the first potential item to enhance an aggregate value of the items distributed by the first container instance.

20. The method of claim 12, wherein adjusting probabilities for the items in the first set of potential items to enhance the likelihood that an aggregate value of the items distributed by the first container instance will not surpass a maximum aggregate value.

21. The method of claim 20, wherein the maximum aggregate value is determined based on the first price.

* * * * *